Jan. 23, 1973    C. J. BORKOWSKI ET AL    3,712,983
DIGITAL RADIATION DOSIMETER WITH IMPROVED
INTEGRATING PULSE IONIZATION CHAMBER
Filed Nov. 9, 1971                                3 Sheets-Sheet 1

INVENTORS.
Casimer J. Borkowski
BY  James M. Rochelle

ATTORNEY.

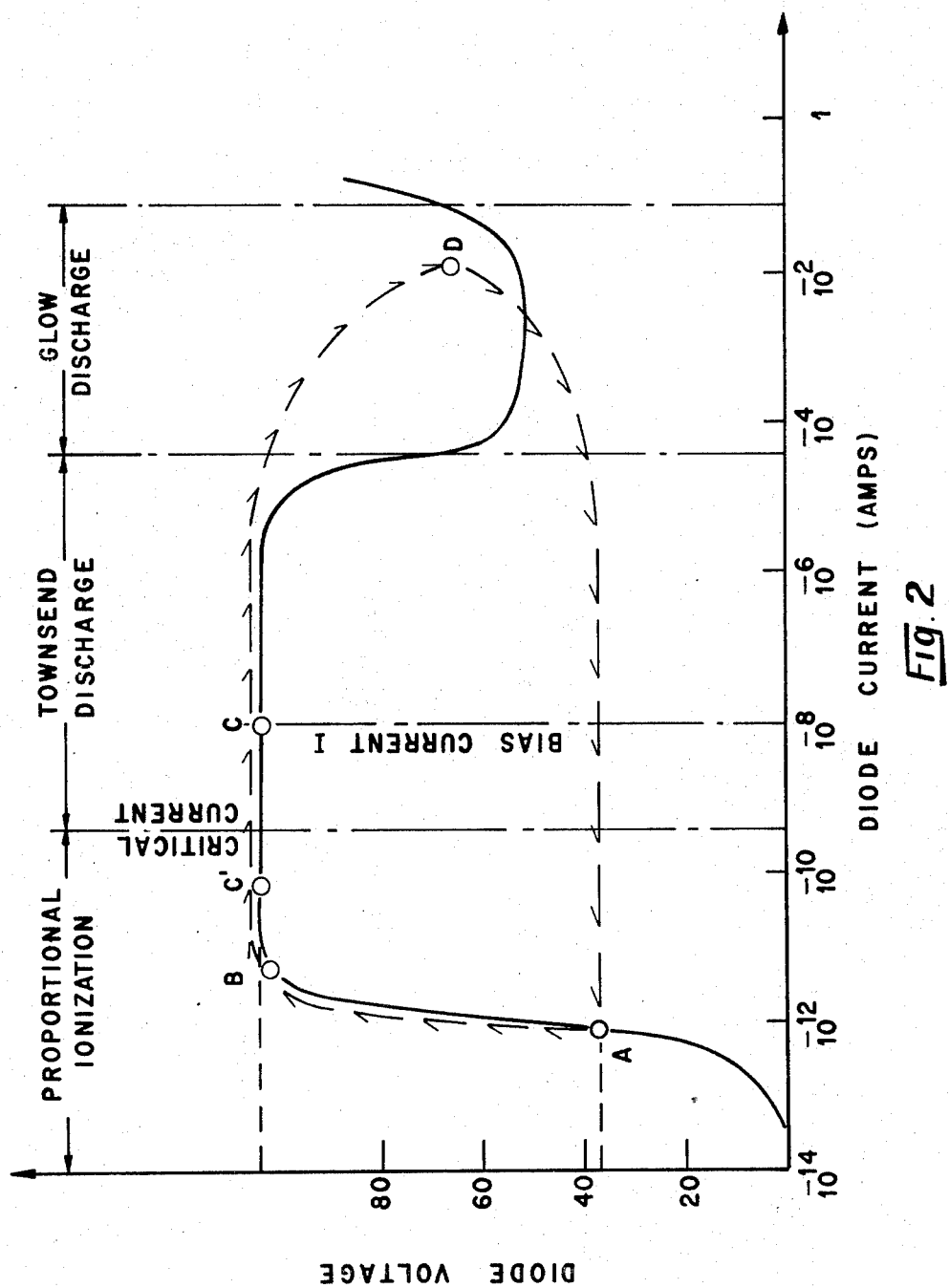

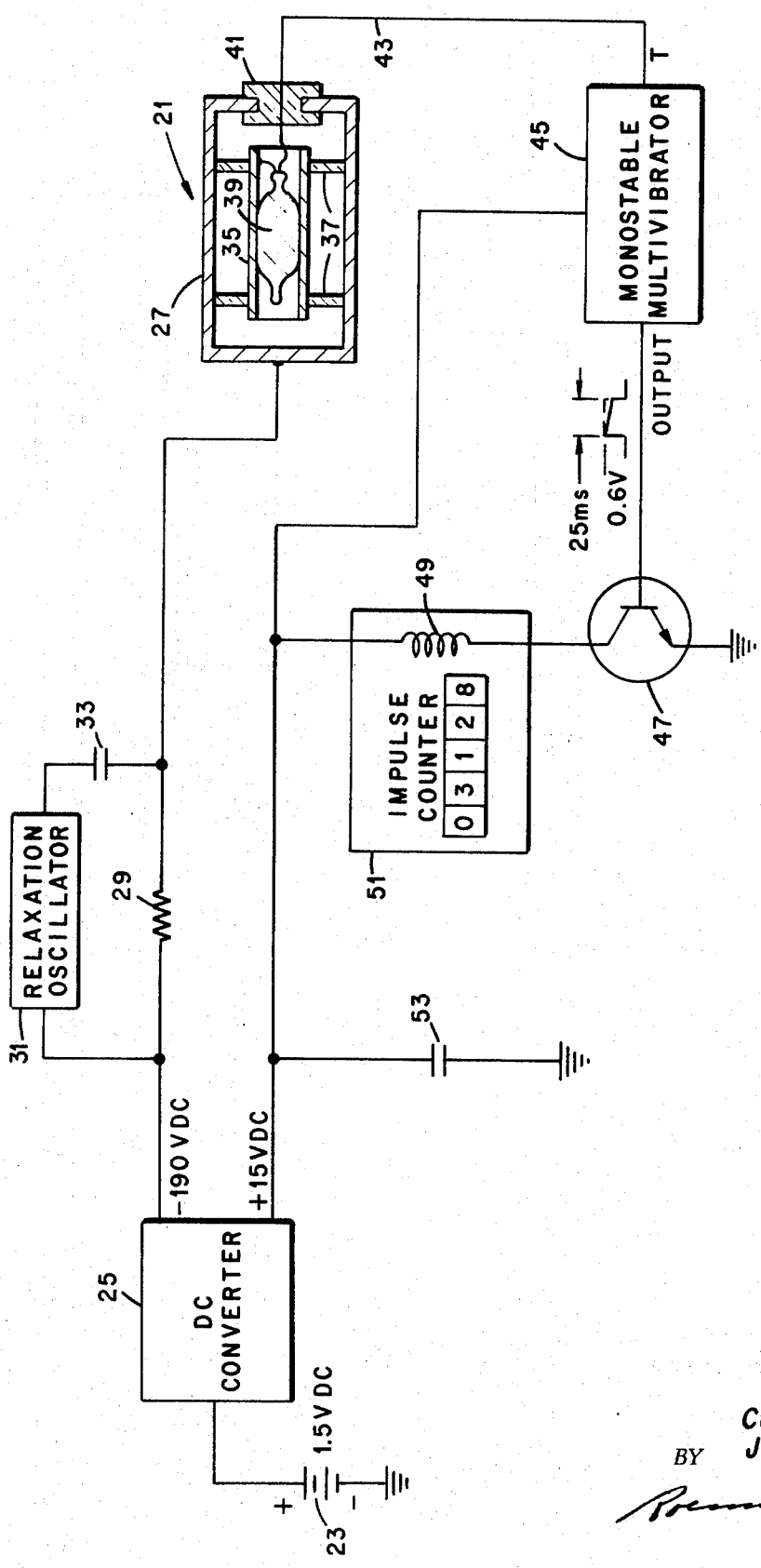

United States Patent Office 3,712,983
Patented Jan. 23, 1973

3,712,983
DIGITAL RADIATION DOSIMETER WITH IMPROVED INTEGRATING PULSE IONIZATION CHAMBER
Casimer J. Borkowski, Oak Ridge, and James M. Rochelle, Knoxville, Tenn., assignors to the United States of America as represented by the United States Atomic Energy Commission
Filed Nov. 9, 1971, Ser. No. 196,888
Int. Cl. G01t 1/18
U.S. Cl. 250—83.6 R                 6 Claims

ABSTRACT OF THE DISCLOSURE

An improved digital radiation dosimeter of the oscillating ionization chamber type including a gas diode connected in series with the chamber anode has been provided with improved operation and miniaturization of the detector chamber. This is made possible by a circuit that adds strobe pulses to the normal DC chamber bias voltage so as to allow the gas diode to discharge even though the active chamber volume is not large enough to produce sufficient diode bias current at low radiation exposure rates.

REFERENCED APPLICATION

U.S. patent application S.N. 196,893 for "Alarm Radiation Dosimeter With Improved Integrating Pulse Ionization Chamber and High Voltage Supply" filed Nov. 9, 1971, and having a common assignee with the present invention.

BACKGROUND OF THE INVENTION

This invention was made during the course of, or under, a contract with the U.S. Atomic Energy Commission.

This invention relates generally to ionization chamber radiation detectors and more particularly to improvements in integrating oscillating ionization chambers wherein the output signals comprise a train of electrical pulses, the repetition rate of which is proportional to the intensity of the detected radiation field.

Miniature radiation dose rate detectors for personal fallout shelter use are designed with respect to low cost, low power, and high utility. Conventional ionization chambers exhibit an average output current which is directly proportional to the incident exposure rate and are perhaps the most desirable of all known dose rate detectors, primarily because of simplicity and a predictable response. Unfortunately, the proper utilization of these excellent detectors presents two serious problems for the radiological instrument designer.

First, the fundamental problem, particularly for low pressure miniature chambers, is the very small signal (current) levels produced at low exposure rates. Second, a characteristic which is particularly bothersome in remote monitoring applications is the inability of an ionization chamber and associated amplifiers to measure more than one decade of dose rate without using range changing (at the high impedance input) or logarithmic amplification. This is, of course, a limitation of any detector having an analog output.

Both limitations described above are removed by converting the conventional ionization chamber to an oscillating or recycling ionization chamber. In this device the average ionization current is converted to a series of current pulses having peak amplitudes of $\sim 10^{-3}$ amperes and a repetition frequency directly proportional to the average ionization current and dose rate. Such is the case with the gas discharge ionization chamber. The gas discharge chamber is simply an ordinary chamber with a cold cathode gas discharge device (hereinafter referred to as a gas diode) such as a neon glow lamp connected in series with the chamber anode. In practice, the gas diode is located inside the hermetically sealed chamber for two very important reasons. First, the controlled atmosphere within the chamber permits a large reduction in leakage currents normally present on the glass envelope of the diode, and secondly, the gas diode must be subjected to the same radiation field as the ionization chamber. The conversion of the average ionization current into a pulse train having a proportional repetition rate is accomplished by the unique behavior of the gas diode.

An oversimplified explanation of gas diode operation is as follows. As the voltage across the electrodes is increased from zero, the only current which flows is the leakage current on the surface of the glass envelope of the diode. If the glass is clean and the surrounding atmosphere is very dry, these leakages can easily be as low as $10^{-16}$ amperes. As the electrode voltage is further increased a critical point is reached at which a gas discharge occurs and rather large currents are allowed to flow. The diode voltage at this critical point is generally known as the "firing voltage," and its usually in the range of 75 to 150 volts. As the gas discharge develops and conducts current, the voltage across the electrodes very rapidly decreases. As the voltage decreases, the established glow discharge eventually collapses, and the lamp once again becomes an open circuit. The voltage at which the discharge extinguishes is known as the "extinguishing voltage" and is usually 15 to 50 volts less than the "firing voltage" in magnitude.

When radiation is being received by the gas discharge chamber and the diode has been extinguished, a charge is collected in the chamber, discharging the chamber capacitance to a point at which the diode fires. When the diode fires, the capacitance very quickly recharges through the diode until the chamber anode voltage again reaches a voltage equal to the diode extinguishing voltage. At this point the discharge extinguishes and another cycle begins. By placing a small resistor in series with the diode, a pulse is obtained each time the diodes fires. Further discussion of the conventional gas discharge ionization chamber may be had by referring to U.S. Pat. 3,177,363 to S. A. Scherbatskoy, issued Apr. 6, 1965.

Unfortunately, the characteristics of a cold cathode gas diode are not as simple and ideal as described in the previous section. The gas diode has been assumed to pass zero current as long as its voltage is below the firing voltage. Then when the firing voltage is reached the diode current abruptly increases to a relatively high value. In reality the gas diode passes a small current before the firing voltage is reached. This diode current can cause errors in the current-to-frequency conversion process as will be described hereinbelow. These errors are particularly bothersome under the conditions of interest here, i.e., small average currents, small parallel capacitance, and varying levels of gamma radiation, due to the miniaturization of the chamber volume. A miniaturized chamber has been found to become unuseable at low radiation exposure rates of interest for measurement with portable radiological instruments due to an insufficient active gas volume that will produce an ionization bias current which is several times larger than the diode critical current defined hereinbelow.

Since the gas discharge ionization chamber is a very desirable and needed detector for a portable radiological instrument if miniature versions could be developed which operate satisfactorily, it has been found that the handicap can be surmounted and smaller chambers utilized by employing a novel circuit technique which periodically raises the diode voltage above the firing voltage thus insuring the formation of a discharge even at low radiation exposure rates.

SUMMARY OF THE INVENTION

In view of the above-stated need, it is an object of this invention to provide a low cost, miniaturized radiation detector employing a gas discharge ionization chamber.

Another object of this invention is to provide an improved integrating pulse ionization chamber radiation detector of the digital or oscillatory type including a series connected gas diode wherein the improvement comprises a circuit which periodically raises the chamber bias voltage a predetermined amount, thereby allowing the formation of a discharge independent of the ionization chamber bias current as the chamber anode voltage approaches the diode firing voltage.

Further, it is an object of this invention to provide a circuit to be used with a digital miniaturized gas discharge chamber of the type including a series connected gas diode for superimposing strobe pulses upon the DC bias voltage applied to the chamber to force the gas diode to fire when the chamber anode voltage approaches the diode firing voltage.

Still another object of this invention is to provide a digital radiation dosimeter of the gas discharge ionization chamber type which is more sensitive to low radiation dose rates even when used with miniaturized ionizaton chambers.

Briefly, the invention is a radiation detector comprising an ionizable gas-filled chamber having a pair of spaced conductive electrodes; a source of DC voltage connected to one of said electrodes so as to establish an electric field in the gas-filled region between said electrodes, causing an ionization current to flow when atoms of said gas are ionized by ionizing radiation and producing a charging voltage on the anode of said pair of chamber electrodes; a normally non-conducting discharge means connected to the anode of said chamber which conducts freely each time the voltage thereacross exceeds a predetermined critical voltage of said discharge means and stops conducting at a predetermined voltage lower than said critical voltage; a strobe pulse generator connected to said one electrode of said ionization chamber to provide voltage pulses of the same polarity as said source so as to raise the chamber anode voltage above said critical voltage to insure conduction of said discharge means as the chamber anode voltage approaches said critical voltage due to ionization of said gas, the repetition rate of discharge means being proportional to the intensity of said ionizing radiation.

Other objects and many of the attendant advantages of the invention will be obvious from the following detailed description of the invention taken in conjunction with the accompanying drawings.

BRIEF DESCRIPTION OF THE DRAWINGS

FIG. 2 is a voltage-current plot of both static and transient operating loci for a typical gas diode employed in the present invention;

FIG. 3 is a schematic diagram of an improved digital radiation dosimeter according to the present invention.

DETAILED DESCRIPTION

Figure 1:
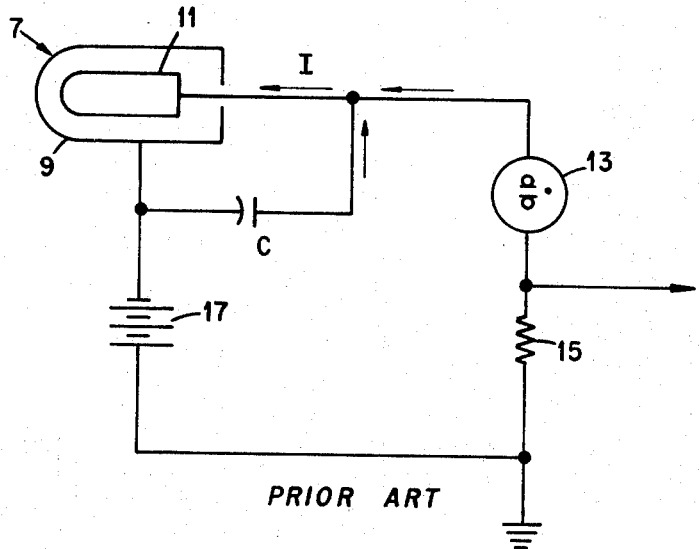
FIG. 1 is a schematic diagram of a typical prior-art gas discharge ionization chamber wherein the chamber capacitance is represented by shunt capacitance C.

Referring now to FIG. 1, there is shown a simplified diagram of a conventional gas discharge chamber which will be used to describe in more detail the problem of obtaining sufficient current output from such a device for low pressure miniature chambers, at low exposure rates.

The chamber 7 typically consists of an outer conductive shell 9 connected as the cathode and an anode 11 electrically insulated from and sealed in an ionizable gaseous atmosphere within the cathode shell 9. The anode is connected in series with a gas diode 13 and a load resistor 15 which has its opposite end connected to ground. A DC bias is applied to the cathode shown here in the form of a battery 17 with the negative pole connected to the cathode 9 and the positive pole connected to ground. The chamber capacitance is shown as a shunt capacitor C.

Since the diode 13 passes a small current before the firing voltage is reached, this causes an error in the current-to-frequency conversion process. The current to be converted, I, which is produced by the ionization chamber divides into two parts with the primary part serving to charge the system capacitance and the second part being equal to the diode current. The frequency of pulse production is proportional to that current which charges $(C+C_d)$ and is thus proportional to the total ion chamber current only if the diode current is zero, $C_d$ being defined as the diode capacitance. The error produced by finite diode current is proportional to the ratios of diode current to ion chamber current. As the ratio of diode to ion chamber current increases, the conversion process deteriorates rapidly until a ratio of unity (diode current equal to ion chamber current) is reached where no current is available to charge the system capacitance causing the diode voltage to reach equilibrium somewhere below the firing voltage, and no input pulses are produced.

Since the gas diode is inside the ion chamber, the radiation field being measured ionizes not only the gas in the ion chamber, but also the gas in the diode thus producing the diode current referred to above. The diode ionization current increases relatively slow as the voltage is increased from zero, as described by FIG. 2. As the voltage increases to within a few volts of the firing voltage, the current begins to increase very rapidly due to a rapidly increasing probability of avalanche occurrence. The average ionization current at any ionization voltage is simply the average value of many current pulses arising from the occurrence of ionizing events in the sensitive volume of the diode.

At voltages well below the firing voltage the positive ions and electrons produced within the diode by one ionizing event are collected without receiving enough energy from the electric field to produce further ionization. In other words, all ionization and, therefore, all the diode current is produced directly by specific ionizing events.

However, as the diode voltage approaches the firing voltage the charge produced in the diode by an ionizing event may tend to undergo growth or multiplication before collection, referred to as a Townsend avalanche.

Referring now to FIG. 2, the exact sequence of events of operation of a typical gas diode 13 placed in a gamma radiation field will be described for a dose rate of 400 roentgens per hour. Assume the sequence begins at point A with the gas diode conducting only ionization current which is much less than the ionization bias current I, produced by the ionization chamber 7. Thus I charges the parallel capacitance and the voltage increases linearly with time a rate of $I/C+C_d$) volts/sec.

At B the gas amplification begins to increase and the current conducted by the diode rapidly increases. The diode current increases until it becomes equal in magnitude to the bias current I at point C. This increase in current can occur in a very short period of time because the necessary charge in voltage is very small.

Point C is a stable or unstable condition depending on whether I is less than or greater than the critical current. The critical current is defined such that when the ionization chamber 7 bias current is less than the critical value, the gas diode does not discharge and vice versa.

Therefore, if I is less than the critical current (in this case $6 \times 10^{-10}$ amps), then the system is stable and comes to an equilibrium at a point C' and, therefore, ceases to function as a radiation detector.

If I is greater than the critical current as is the case in FIG. 2, then point C is an unstable condition and the diode current continues to grow into what is defined as a transient glow discharge reaching a peak value at point D where the discharge ceases its growth and begins to collapse and return to point A along an operating locus, as indicated by the broken line path. This transient operating locus does not necessarily coincide with the static V–I locus. Also, the voltage at point A is not necessarily the same as the static regulating voltage of the glow discharge region, this being the region in which a diode of this type is universally used as a voltage regulator or indicator.

The stability or instability of point C is closely related to the slope of the static V–I locus at point C. For all currents to the left of the critical current, the slope ($dv/di$) is positive meaning that operating points in this region are stable. The slope becomes zero at the critical current and goes negative at Townsend currents greater than the critical value thus creating an unstable region.

As pointed out above the gas discharge ionization chamber may come to a useless equilibrium at point C' as illustrated in FIG. 2 unless the active volume of the chamber is large enough to produce an ionization bias current for the diode which is several times larger than the critical current. Normally, this problem is overcome by increasing the ionization chamber gas volume and thereby insuring that the bias current produced in the chamber by a given radiation field exceeds the diode critical current. However, the primary object of this invention is to provide a reliable miniaturized gas discharge ionization chamber with an effective gas volume corresponding to a volume less than that occupied by 50 cc. of argon at ambient temperature and pressure. A volume of this size does not produce an ionization bias current greater than the diode critical current. It has been found that the handicap can be surmounted and smaller chambers utilized by employing a circuit technique which periodically raises the diode voltage above the breakdown voltage by means of fixed duration strobe pulses superimposed upon the chamber bias voltage, thus insuring the formation of a discharge.

The technique is used to good advantage for correcting those detectors which might otherwise come to an equilibrium somewhere to the right of point B, as at point C'. In this region the diode voltage is at most only one or two volts below the static diode firing voltage.

Referring now to FIG. 3, the improvement will be described as applied to a miniaturized digital integrating dosimeter employing a miniaturized gas discharge ionization chamber 21. A 1.5 v. DC source, such as a single D cell battery 23, is connected with the positive terminal to the input of a feedback regulated DC-to-DC converter 25 which provide $-190°$ V. DC and $+15$ v. DC at separate outputs thereof. Converter 25 is connected at its $-190$ v. output to the housing (cathode) 27 of the ionization chamber 27 through a biasing resistor 29. The $-190$ v. output of converter 25 is also connected to the input of a relaxation oscillator 31 which has its output connected through a coupling capacitor 33 to the cathode 27 of the ionization chamber 21. The oscillator 31 provides the strobe pulses at a rate of approximately 100 pulses/sec. which are fixed duration negative pulses of approximately 600 $\mu$sec. in width and $-20$ v. in amplitude. These pulses are superimposed upon the negative DC bias applied to the chamber cathode, and are effectively coupled to the chamber anode by the chamber interelectrode capacitance.

Although the converter 25 may take the form of a conventional blocking oscillator type including a transformer with multiple windings to provide the proper voltages, it will be understood that further miniaturization may be had by employing a transformerless power supply including a strobe pulse generator in the form of ripple pulses as disclosed in the above-referenced copending application. In this case, both the converter 25 and the oscillator 31 would be replaced by the transformerless power supply.

The configuration of the ionization chamber may take various forms. The preferred miniature sized form shown in FIG. 3 may be constructed of a hermetically sealed aluminum can outer shell forming the cathode 21. Typically, the can would be 0.75 inch O.D. by 1.5 inches outside length with a wall thickness of approximately 0.015 inch.

The anode 35 may be a copper tube approximately 0.290 inch O.D. by 0.032 inch walls by 1.25 inches in length, horizontally disposed within the can or cathode at the longitudinal axis of the can. The anode may be held by means of insulators 37 and the gas diode 39 disposed within the anode tube 35. One lead of the gas diode 39 is connected to the anode 35 and the other lead, from which the chamber output is taken, extends through an insulator such as a glass plug 41 for external connection by means of lead 43. The chamber volume may be filled with various ionizable gases depending upon the radiation being monitored. Typically, the chamber would be filled with argon or nitrogen to a pressure of 1 atmosphere for a gamma ray dosimeter.

The output lead 43 of the chamber is connected to the trigger input T of a complementary monostable multivibrator 45. The output of the multivibrator 45 is connected to the base electrode of a switching transistor 47. Each time an event is detected by the chamber a very short duration ($\sim 3$ $\mu$sec.) negative pulse is applied to multivibrator 45 which, in turn, generates a positive pulse of approximately 25 ms., turning transistor 47 on for that period.

The emitter of transistor 47 is connected to ground and the collector is connected to the $+15$ v. DC supply through a drive coil 49 of a conventional impulse counter 51. The $+15$ v. DC supply lead is also connected to the monostable multivibrator 45 as the supply voltage. The additional energy necessary to activate the counter drive coil 49 is stored in a storage capacitor 53 connected between the $+15$ v. DC supply line and ground.

In operation, the battery voltage is applied to the DC-to-DC converter 25 by means of a switch (not shown). With the chamber 21 not exposed to a radiation field, its cathode is only subjected to the $-190$ v. DC bias voltage having approximately 20 volts of ripple at a frequency of 100 pulses/sec. superimposed on it by oscillator 31. The gas diode 39 under these conditions is inactive.

Figure 4:
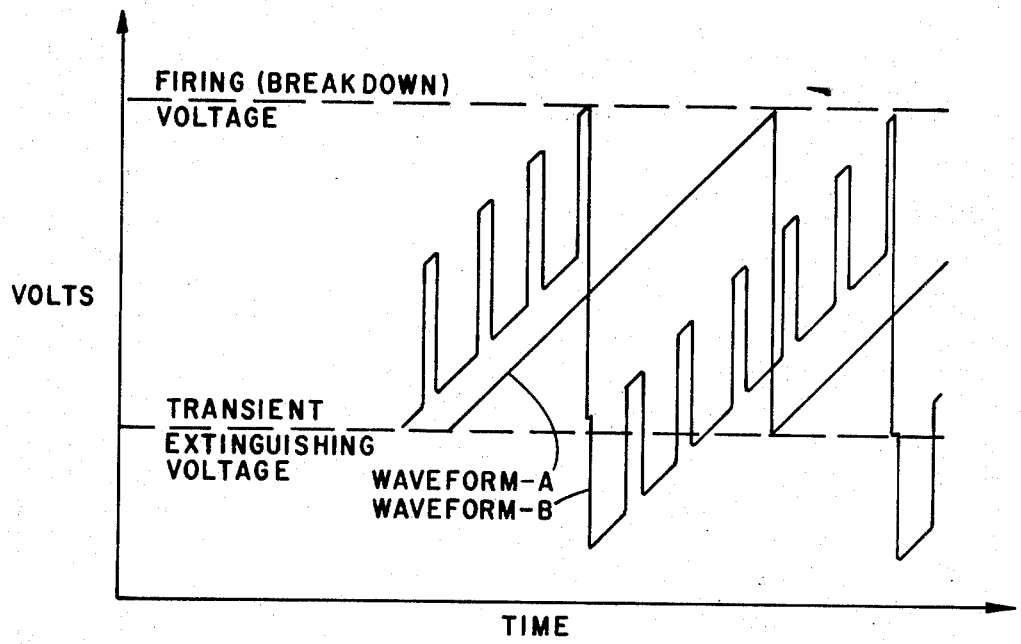
FIG. 4 depicts comparison plots of the waveforms at the anode of the ionization chambers of both FIG. 1 and FIG. 3.

When the chamber is placed in a gamma radiation field, for example, ionization results in the accumulation of charge on the anode 35 and one electrode (not shown) of the gas diode. As shown in FIG. 4, the voltage across the diode 39 (waveform B) charges on the same ramp (waveform A) as in the prior art case except for the addition of the strobe pulses superimposed as shown by waveform B. After the ramp reaches the neighborhood of point B (FIG. 2), the first strobe pulse lifts the diode voltage above the breakdown voltage and the transient glow discharge is initiated.

The actual shape of the strobe pulses must be such that they can be simply separated from bona fide discharge pulses by the monostable multivibrator. The logical approach is to make the rise and decay time of the strobe pulses much longer than corresponding times of the relatively fast discharge pulse. The slower strobe pulses can then be rejected by a simple differentiator comprising a series coupling capacitor, which in this case is simply the interelectrode capacitance of the diode.

At the breakdown voltage of diode 39, the glow discharge is produced an a 3 $\mu$sec. duration, 1.2 v. negative going pulse occurs on lead 43. This negative pulse triggers multivibrator 45 causing it to switch to its semistable state, generating the 25 millisecond pulse at the output (as determined by the timing of the multivibrator). This pulse is applied to the base of transistor 47 turning it "On" and causing a current to flow through the drive coil 49 of the counter 51 for the duration of the 25 msec. pulse. The energizing of coil 49 advances the impulse counter one count. The advancing of the counter will be understood then to occur at a rate depending on the intensity of the radiation field.

Since each chamber pulse counted by the counter corresponds to a fixed radiation dose, the detector becomes an integrating dosimeter simply by counting the total number of pulses and multiplying by the per pulse dose. In fact, if the detector calibration is 10 mR/pulse or 100 mR/pulse, then the total count is converted to roentgens simply by proper location of the decimal point and no conversion is required. For example, if the counter readout is 2894 counts and the detector calibration is 10 mR/count, then the total integrated dose is 28.94 roentgens. Thus, the total dose for an operating period is provided with direct digital readout.

Impulse counters which operate up to 10 counts/sec. (corresponding to 360 R/hr. for a 10 mR/pulse chamber) are commercially available. This range is sufficient for fallout shelter applications which is the primary intended use for this instrument.

In the present example a 10 mR/pulse detector results in the following count repetition rates:

| | |
|---|---|
| 360 R/hr. | One count every 0.1 sec. |
| 36 R/hr. | One count every 1 sec. |
| 3.6 R/hr. | One count every 10 sec. |
| 0.36 R/hr. | One count every 1 min. and 40 sec. |

It will be appreciated that an ordinary wrist watch with a sweep second hand can be used with the detector to obtain absolute rate measurement; probably of secondary importance for a shelter instrument.

It will be appreciated that other practical techniques for applying the strobe pulses could be applied. If necessary, both the strobe pulses and a positive chamber bias could be applied to the anode of the chamber rather than a negative voltage to the cathode as described.

The gas diode 39 used in this example is an ordinary glow lamp, such as a Signalite TRQ–250, that has been carefully selected to provide optimum performance.

Therefore, it will be seen that a gas discharge ionization chamber has been made practical for use as an inexpensive accurate digital integrating dosimeter by means of applying strobe pulses to the normal chamber bias to insure discharge of the gas diode within the chamber even though the gas volume may not be large enough to produce sufficient diode bias current in weak radiation fields.

Although the invention has been described by way of example, it should not be considered limited by this example but by the following claims attached to and forming a part of this specification.

What is claimed is:

1. A radiation detector comprising an ionizable gas-filled chamber having a pair of spaced apart conductive electrodes; a source of DC voltage connected to one of said electrodes so as to establish an electric field in the gas-filled region between said electrodes, causing ionization current to flow therebetween when atoms of said gas are ionized by ionizing radiation and producing a charging voltage on the other electrode of said pair of chamber electrodes; a normally non-conducting discharge means connected to said other electrode of said chamber which conducts freely each time the voltage thereacross exceeds a predetermined critical voltage of said discharge means and stops conducting at a predetermined voltage lower than said critical voltage; and a stroke pulse generator connected to said one electrode of said ionization chamber to provide voltage pulses of the same polarity as said source so as to raise the charging voltage above said critical voltage to insure conduction of said discharge means as the chamber charging voltage approaches said critical voltage due to ionization of said gas, the repetition rate of discharge of said discharge means being proportional to the intensity of said ionizing radiation.

2. A radiation detector as set forth in claim 1 further including means connected to said discharge means for recording the number of repetitions of discharge of said discharge means.

3. A radiation detector as set forth in claim 1 wherein said discharge means comprises a gas diode disposed within said ionization chamber and having a first electrode connected to said charge collecting electrode of said ionization chamber and a second electrode connected as the output of said chamber, whereby each time said diode fires, discharging said chamber, a short duration pulse is generated at said second electrode thereof.

4. A radiation detector as set forth in claim 3 wherein said strobe pulse generator includes a resistor connected in series with the output of said DC voltage source connected to said one electrode of said chamber, and a relaxation oscillator connected in parallel with said resistor.

5. A radiation detector as set forth in claim 4 wherein said recording means includes a monostable multivibrator having a trigger input connected to said second electrode of said diode and generating a fixed duration pulse at an output thereof in response to the application of said short duration pulse applied to the input thereof, a transistor switch having a base, emitter and collector electrode, said base electrode being connected to the output of said multivibrator, an impulse counter having a drive coil connected in series with said collector and emitter electrodes of said switching transistor between a source of supply voltage and ground potential so that each time said multivibrator is triggered said transistor switch is turned on for the duration of the output pulse from said multivibrator allowing current to flow through said drive coil of said counter, thereby registering a count corresponding to a predetermined radiation dose measured by said chamber per discharge.

6. A radiation detector as set forth in claim 5 wherein the effective ionizable gas volume within said chamber corresponds to less than the volume of 50 cc. of argon at ambient conditions.

References Cited

UNITED STATES PATENTS

| | | | |
|---|---|---|---|
| 2,506,435 | 5/1950 | Rossi et al. | 250—83.6 R |
| 2,752,508 | 6/1956 | Zito | 250—83.6 R |
| 3,614,445 | 10/1971 | Platzek et al. | 250—83.6 R |

ARCHIE R. BORCHELT, Primary Examiner

U.S. Cl. X.R.

250—83.6 P